(12) United States Patent
Shackleton et al.

(10) Patent No.: US 6,963,596 B2
(45) Date of Patent: Nov. 8, 2005

(54) PRE-IONIZER FOR RF-ENERGIZED GAS LASER

(75) Inventors: Christian J. Shackleton, Granby, CT (US); Phillip Gardner, West Hartford, CT (US); William Clayton Brand, San Jose, CA (US); Raul Wong Gutierrez, Windsor Locks, CT (US)

(73) Assignee: Coherent, Inc., Santa Clara, CA (US)

( * ) Notice: Subject to any disclaimer, the term of this patent is extended or adjusted under 35 U.S.C. 154(b) by 78 days.

(21) Appl. No.: 10/766,335

(22) Filed: Jan. 28, 2004

(65) Prior Publication Data

US 2005/0163183 A1    Jul. 28, 2005

(51) Int. Cl.[7] ............................. H01S 3/097; H01S 3/22
(52) U.S. Cl. ............................ 372/86; 372/87; 372/57
(58) Field of Search ..................... 372/55, 57, 86–87

(56) References Cited

U.S. PATENT DOCUMENTS

| | | | |
|---|---|---|---|
| 4,380,079 A * | 4/1983 | Cohn et al. ................... 372/87 |
| 4,555,787 A * | 11/1985 | Cohn et al. ................... 372/86 |
| 4,885,754 A | 12/1989 | Egawa ........................... 372/86 |
| 4,953,174 A * | 8/1990 | Eldridge et al. .............. 372/87 |
| 5,123,028 A | 6/1992 | Hobart et al. ................. 372/95 |
| 5,347,531 A * | 9/1994 | Nakatani et al. .............. 372/86 |
| 5,434,881 A | 7/1995 | Welsch et al. ................ 372/87 |
| 5,438,587 A * | 8/1995 | Kinley ......................... 372/86 |
| 6,556,609 B2 * | 4/2003 | Bragin et al. ................. 372/57 |
| 6,608,853 B1 * | 8/2003 | Yoshioka et al. ............. 372/87 |
| 6,654,402 B1 * | 11/2003 | Kakizaki et al. ............. 372/86 |
| 6,757,315 B1 * | 6/2004 | Bragin et al. ................. 372/57 |
| 6,771,685 B1 * | 8/2004 | Yabu et al. .................... 372/87 |
| 6,859,482 B1 * | 2/2005 | Strowitzki et al. ........... 372/87 |

FOREIGN PATENT DOCUMENTS

EP       0 664 589 A1      1/1995     ......... H01S 3/0975

* cited by examiner

Primary Examiner—Don Wong
Assistant Examiner—Hung Tran Vy
(74) Attorney, Agent, or Firm—Stallman & Pollock LLP

(57) ABSTRACT

A pre-ionizing arrangement for a gas laser includes two ceramic-jacketed ionizer electrodes extending into an enclosure including spaced-apart slab electrodes of the laser and a lasing gas at reduced pressure. RF power is applied to the dielectric-jacketed ionizer electrodes creating a gas discharge between the dielectric-jacketed ionizer electrodes. This discharge provides ions in the laser gas. The presence of these ions in the lasing gas facilitates ignition of a gas discharge between the slab electrodes for energizing the laser.

16 Claims, 5 Drawing Sheets

PRE-IONIZER FOR RF-ENERGIZED GAS LASER

TECHNICAL FIELD OF THE INVENTION

The present invention relates generally to slab lasers energized by radio frequency (RF) power being applied to a lasing gas including carbon dioxide ($CO_2$) and thereby creating a gas discharge in the lasing gas. The invention relates in particular to an arrangement for pre-ionizing the lasing gas to facilitate igniting the discharge.

DISCUSSION OF BACKGROUND ART

In RF discharge energized slab $CO_2$ lasers an arrangement (pre-ionizer) for pre-ionizing the lasing gas to facilitate igniting the RF discharge is often provided. A slab laser usually has a sealed enclosure filled with the lasing gas. The lasing gas pressure is usually between about 50 and 150 Torr. A pair of elongated slab electrodes is arranged in the enclosure with the slab electrodes parallel to each other and spaced apart defining a discharge gap between the electrodes. The discharge gap is filled with the lasing gas of the enclosure. Applying RF power to the slab electrodes ignites and sustains a discharge in the discharge gap, thereby energizing the lasing gas and causing the laser to lase. In the absence of a pre-ionizer, the time required to ignite the discharge between the slab electrodes can vary randomly, or in order to ignite the discharge, it may be necessary to increase the RF power to a level two or more times greater than the power necessary to sustain the discharge once it is ignited.

In one preferred prior-art pre-ionizer, a pair of closely spaced metal pre-ionizer electrodes or pins, is located in the enclosure in which the main (slab) electrodes are located. The electrodes are typically spaced by between about 0.5 and 1.0 millimeter (mm). The pre-ionizer electrodes are significantly smaller than the slab electrodes, and are located near a wall of the enclosure remote from the discharge gap. RF power is applied constantly to the pre-ionizer electrodes and creates a local discharge around the pre-ionizer electrodes, this discharge being of small volume compared to the volume of the enclosure. The close spacing is required to ensure that the pre-ionizer discharge itself ignites reliably. The pre-ionizer discharge provides ions that diffuse throughout the volume of laser gas in the enclosure. These ions are generated directly by the local discharge, and indirectly generated by interaction of the lasing gas with fluorescence radiation (particularly ultraviolet radiation) emitted by the discharge. The presence of these ions in the lasing gas volume facilitates igniting the lasing gas discharge between the slab electrodes when the main RF power is applied to the electrodes, and can allow essentially instantaneous ignition of the discharge. This reduces the excess power that needs to be applied to ignite the main discharge.

A problem with prior art pre-ionizing arrangements including such closely spaced metal electrodes is that these metal electrodes generate particulate matter during operation over thousands of hours. This particulate matter is generated, inter alia, by sputtering and corrosion of the pre-ionizer electrodes and can be harmful inside the lasing gas enclosure. There is a need for a pre-ionizing arrangement that does not generate such particulate matter.

SUMMARY OF THE INVENTION

The present invention is directed to a pre-ionizing arrangement for a gas laser. The gas laser includes two elongated slab electrodes arranged face-to-face, defining a gap therebetween, the electrodes being located in an enclosure containing a laser gas at reduced pressure. The laser gas fills the gap between the slab electrodes. The laser is energized by applying electrical power across the slab electrodes, thereby igniting a primary gas discharge in the laser gas between the dielectric-jacketed electrodes.

In one aspect, the inventive ionizing arrangement comprises two ionizer electrodes each thereof surrounded by a dielectric jacket. The dielectric-jacketed ionizer electrodes extend into the enclosure remote from the slab electrodes and have a space therebetween. Means are provided for applying RF power to the dielectric-jacketed ionizer electrodes. Applying the RF power to the ionizer electrodes creates a secondary gas discharge in the space between the ionizer electrodes. The secondary gas discharge provides ions in the laser gas, and thereby facilitates ignition of the primary gas discharge.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
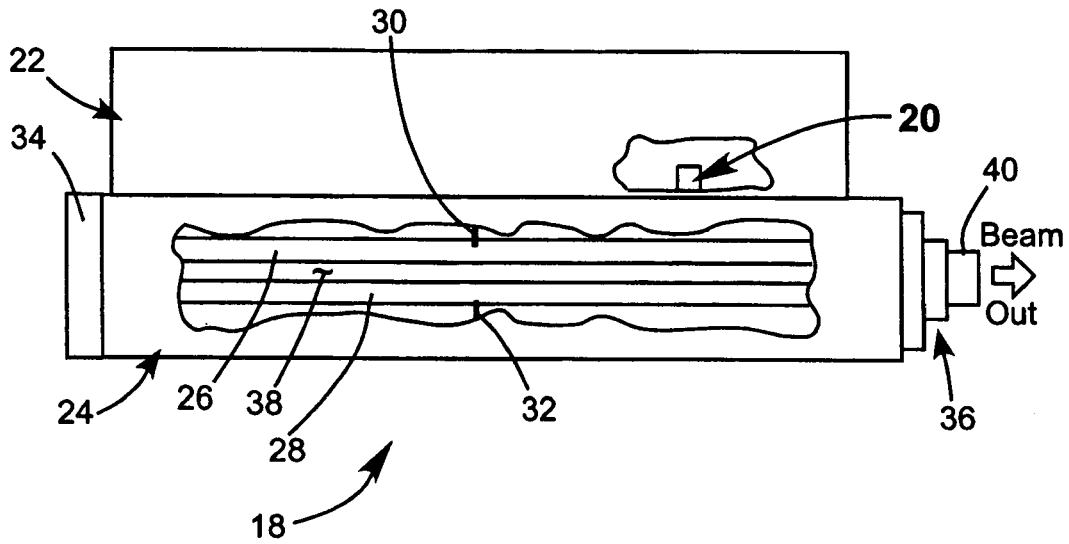
FIG. 1 is a cutaway side elevation view schematically illustrating an RF energized slab laser having a laser enclosure at low pressure containing slab electrodes and a lasing gas, the laser enclosure being surmounted by a power enclosure at atmospheric pressure, the power enclosure for housing an integrated RF power supply for the laser and also including components of a pre-ionizer in accordance with the present invention.
Figure 2:
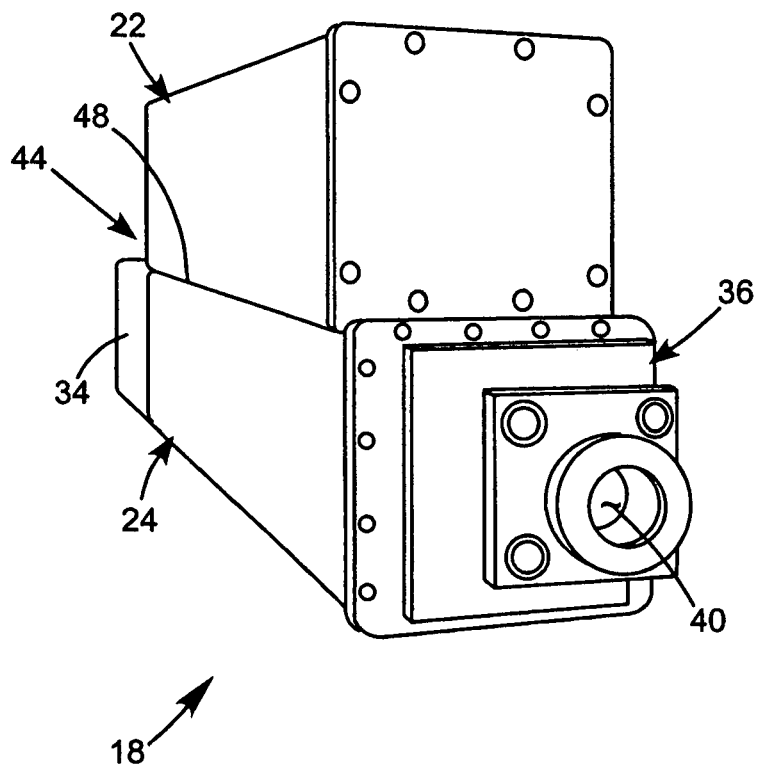
FIG. 2 is a perspective view schematically illustrating detail of a preferred arrangement of an integrated laser and power enclosure in one example the laser of FIG. 1.

Turning now to the drawings, wherein like features are designated by like reference numerals, FIG. 1 and FIG. 2 schematically illustrate a slab laser 18 including a pre-ionizer 20 in accordance with the present invention. Laser 18 includes an upper enclosure 22 and a lower enclosure 24. Upper enclosure 22 is at atmospheric and contains RF power supply circuitry (not shown) for powering the laser and the pre-ionizer. Enclosure 22 is referred to hereinafter as the power enclosure. Lower enclosure 24 is at a low (less than atmospheric) pressure, for example, between about 50.0 and 150.0 Torr. Enclosure 24 contains lasing gas and components of the slab laser including slab electrodes 26 and 28. Slab electrode 26 receives radio frequency (RF) power from a supply thereof (not shown) in power enclosure 22 via an electrode 30. Slab electrode 28 is connected to ground by an electrode 32. Mirrors (not explicitly shown) for forming a laser resonator are held at opposite ends of the laser enclosure in mirror mounts 34 and 36. The laser resonator extends through a gap 38 between slab electrodes 26 and 28. A discharge is formed in the gap when sufficient RF power is applied to electrodes 26 and 28. An output beam of the laser exits enclosure 24 via a window 40 laterally offset in mirror mount 36.

It should be noted here that only a basic description of laser 18 is provided herein to indicate how preferred embodiments of the inventive pre-ionizer may be integrated into this and other slab lasers. A detailed description of the construction and operation of RF-energized slab lasers in general is provided in U.S. Pat. No. 5,123,028 the complete disclosure of which is hereby incorporated by reference.

Figure 3:
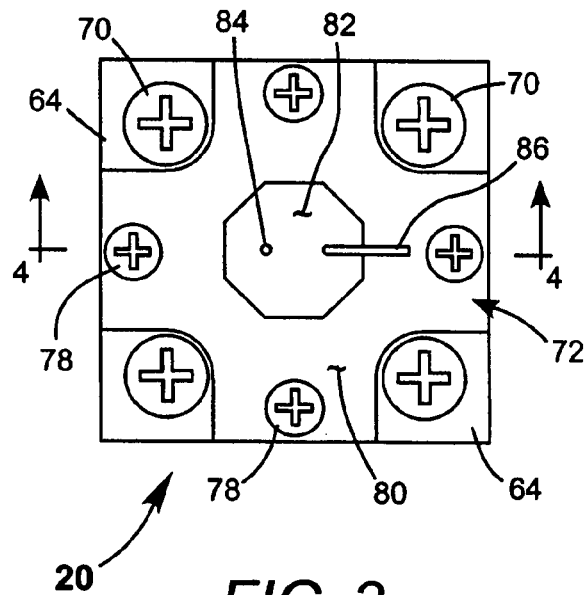
FIG. 3 is a plan view from above schematically illustrating one preferred embodiment of a pre-ionizer in accordance with the present invention.
Figure 5:
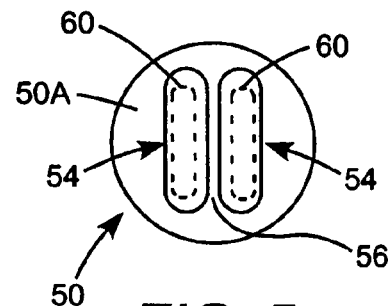
FIG. 5 is a plan view from below, schematically illustrating further details of the ceramic crucible of FIG. 4 and the extensions thereof.
Figure 5A:
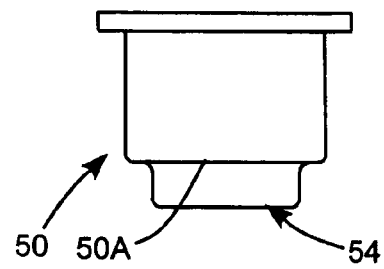
FIG. 5A is an elevation view of the ceramic crucible of FIG. 5.
Figure 4:
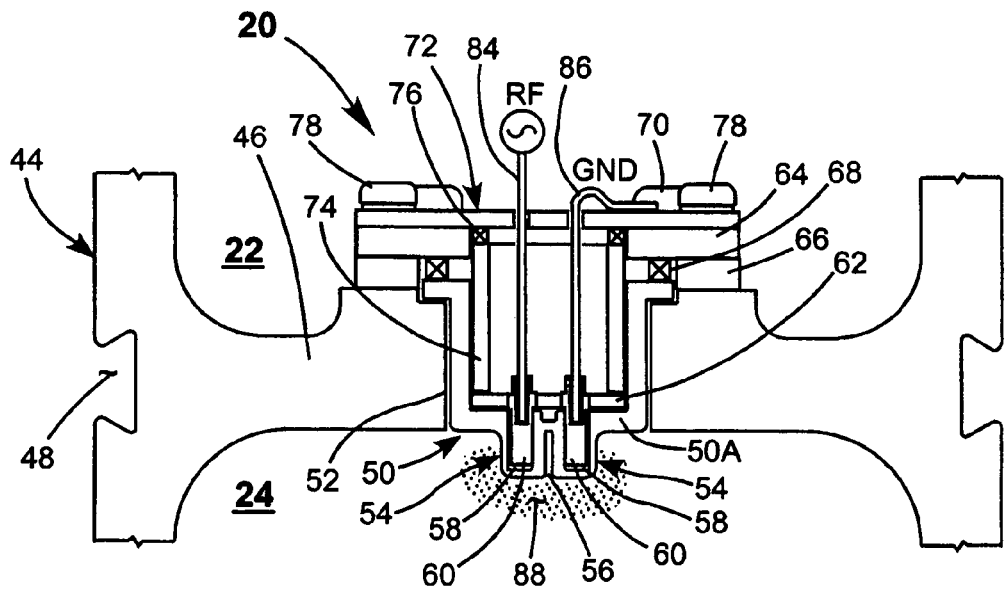
FIG. 4 is a fragmentary cross section view, taken transversely through the integrated laser and power enclosures of FIG. 2 and seen generally in the direction 4—4 of FIG. 3, schematically illustrating details of the pre-ionizer of FIG. 3, the pre-ionizer including a ceramic crucible extending through a partition between the laser and power enclosures, the ceramic crucible having two spaced apart extensions extending into the laser enclosure, each of the extensions surrounding one of two electrodes of the pre-ionizer.
Figure 6:
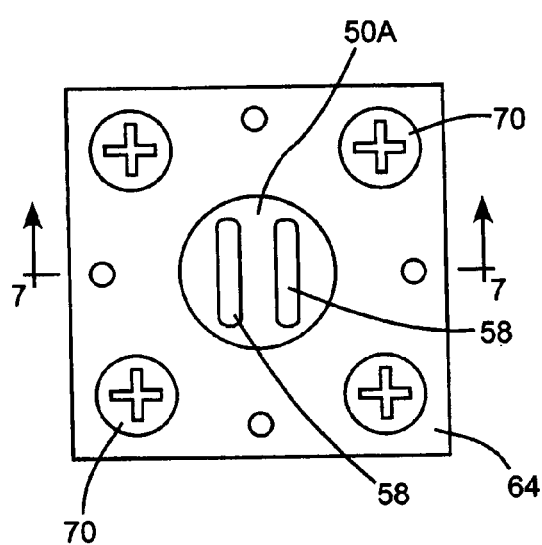
FIG. 6 is a plan view from above, schematically illustrating the pre-ionizer of FIGS. 3 and 4 without the electrodes and components for assembling and retaining the electrodes in the ceramic crucible.
Figure 8:
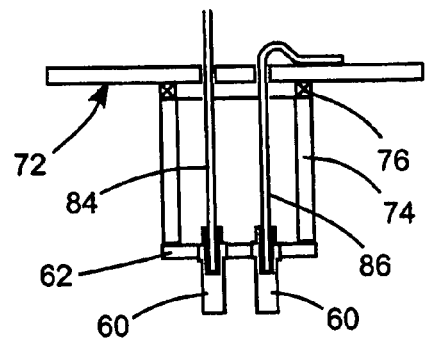
FIG. 8 is a side-elevation view from below schematically illustrating the electrodes of the pre-ionizer of FIGS. 3 and 4 assembled on an insulating disc, a spacer tube and a retaining plate for clamping the insulating disc in the crucible with the electrodes in the crucible extensions, and electrical leads extending through the retaining plate into the electrodes for supplying electrical power to the electrodes.
Figure 9:
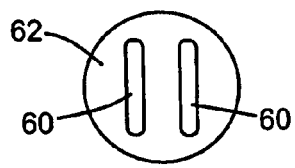
FIG. 9 is a plan view from below schematically illustrating further details of the insulating disk and electrodes of FIG. 8.

Continuing with reference to FIG. 2, and with reference in addition to FIG. 3 and FIG. 4, in one preferred embodiment of laser 18 suitable for accommodating the inventive pre-ionizer, upper and lower enclosures 22 and 24 are formed in an aluminum extrusion 44. Extrusion 44 has a hollow, generally rectangular, overall cross-section and is partitioned into the enclosures 22 and 24 by a dividing partition 46 (see FIG. 4) the position of which is indicated in FIG. 2 by groove 48. Pre-ionizer 20 is formed in a dielectric (insulating) crucible 50, extending through partition 46. Crucible 50 is formed from a material that will not be corroded, flaked, or fragmented by contact with a gas discharge in the lasing gas, and is preferably formed from a refractive ceramic such as alumina (aluminum oxide $Al_2O_3$). It is pointed out here that in FIG. 3, a cross-section view, and in all other cross-section views referred to hereinafter in this description, traditional shading is omitted to prevent obscuration of important construction details. To further clarify these details, components of pre-ionizer 20 are depicted in various different aspects and various degrees of disassembly in FIG. 5, FIG. 5A, FIG. 6, FIG. 7, FIG. 8 and FIG. 9 to which reference is made hereinafter, where appropriate.

Figure 7:
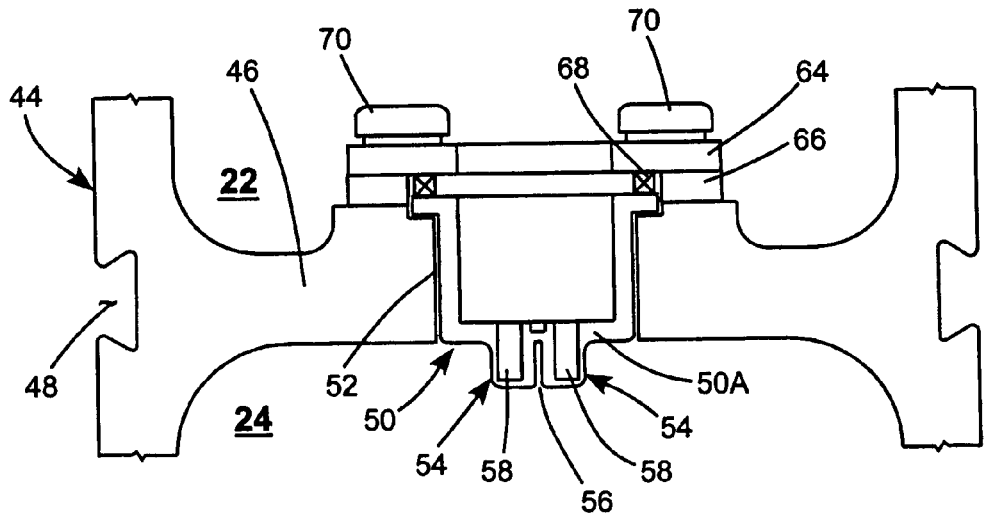
FIG. 7 is a fragmentary cross section view, taken transversely through the integrated laser and power enclosures of FIG. 2 and seen generally in the direction 7—7 of FIG. 6, schematically illustrating details of the pre-ionizer of FIGS. 3 and 4 without the electrodes and components for assembling and retaining the electrodes in the ceramic crucible.
Figure 10:
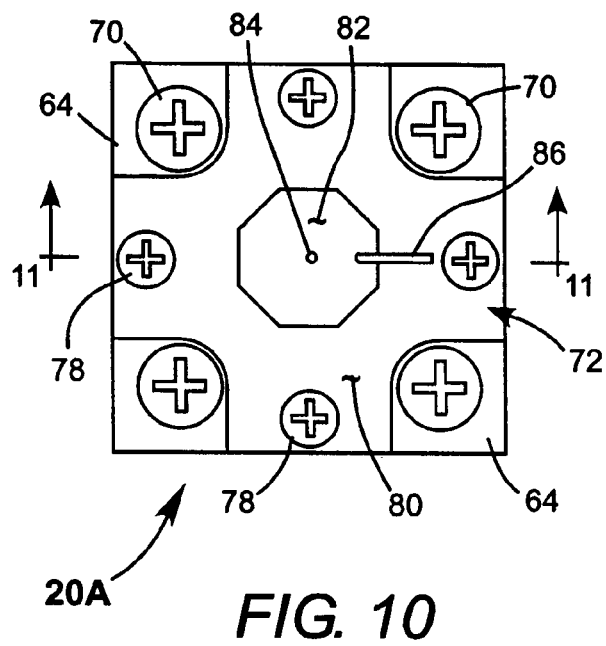
FIG. 10 is a plan view from above schematically illustrating another preferred embodiment of a pre-ionizer in accordance with the present invention.
Figure 12:
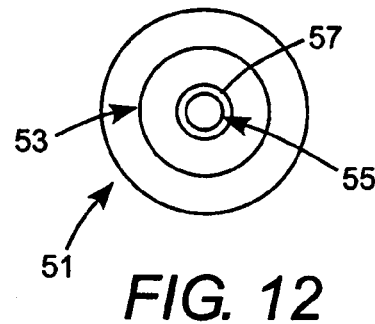
FIG. 12 is a plan view from below, schematically illustrating further details of the ceramic crucible of FIG. 11 and the extensions thereof.
Figure 12A:
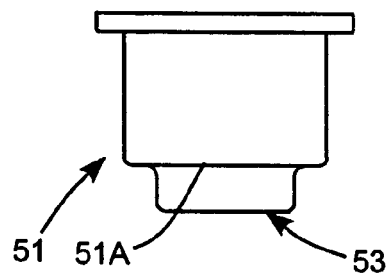
FIG. 12A is an elevation view of the ceramic crucible of FIG. 12.
Figure 11:
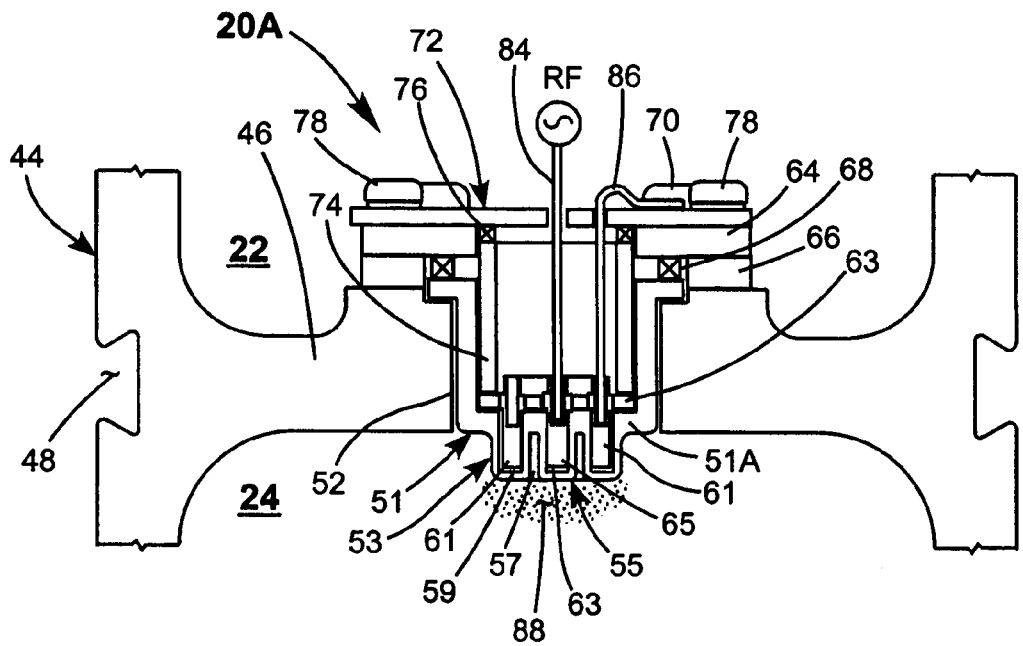
FIG. 11 is a fragmentary cross-section view, taken transversely through the integrated laser and power enclosures of FIG. 2 and seen generally in the direction 11—11 of FIG. 10, schematically illustrating details of the pre-ionizer of FIG. 10 including a ceramic crucible extending through a partition between the laser and power enclosures, the ceramic crucible having a central cylindrical or post extension surrounded by an annular extension, with both extensions extending into the laser enclosure, and the extensions surrounding respectively a post electrode and an annular electrode of the pre-ionizer.
Figure 13:
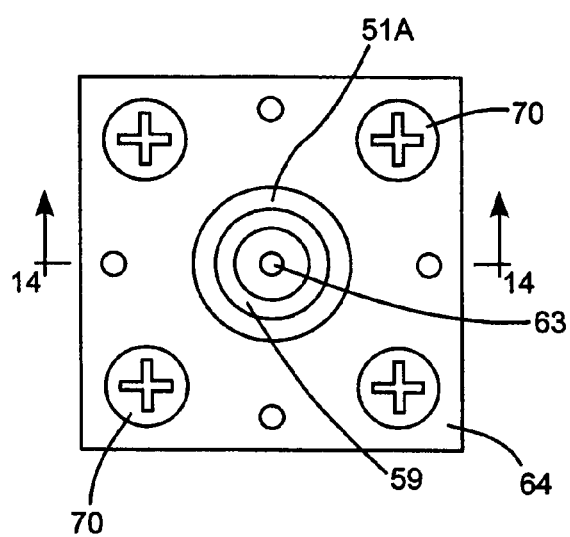
FIG. 13 is a plan view from above, schematically illustrating the pre-ionizer of FIGS. 10 and 11 without the electrodes and components for assembling and retaining the electrodes in the ceramic crucible.
Figure 15:
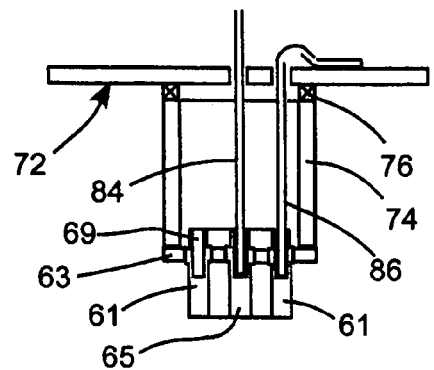
FIG. 15 is a side-elevation view from below, schematically illustrating the electrodes of the pre-ionizer of FIGS. 10 and 11 assembled on an insulating disc, a spacer tube and a retaining plate for clamping the insulating disc in the crucible with the electrodes in the crucible extensions, and electrical leads extending through the retaining plate into the electrodes for supplying electrical power to the electrodes.
Figure 16:
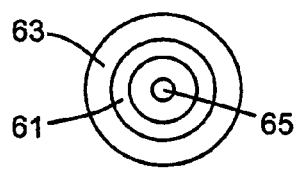
FIG. 16 is a plan view from below schematically illustrating further details of the insulating disk and electrodes of FIG. 15.
Figure 14:
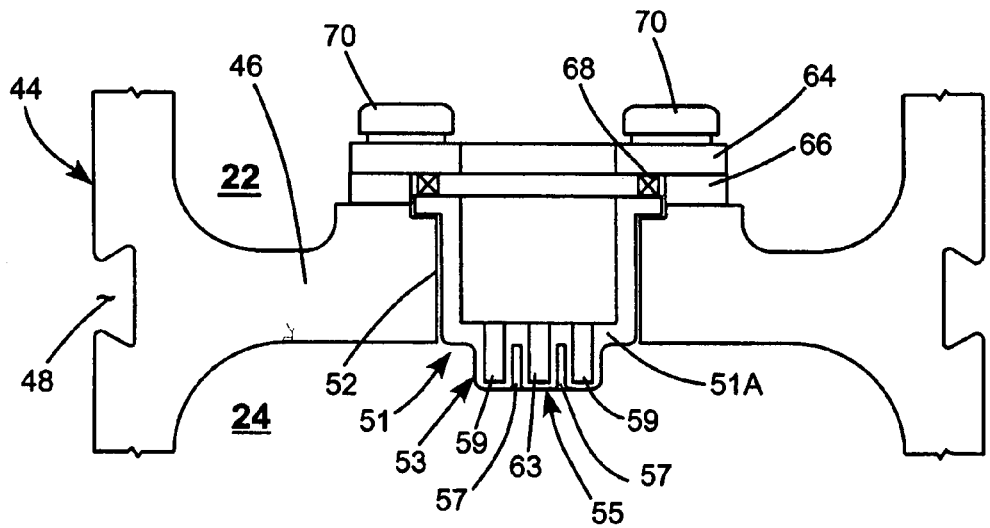
FIG. 14 is a fragmentary cross section view, taken transversely through the integrated laser and power enclosures of FIG. 2 and seen generally in the direction 14—14 of FIG. 13, schematically illustrating details of the pre-ionizer of FIGS. 10 and 11 without the electrodes and components for assembling and retaining the electrodes in the ceramic crucible.

Crucible 50 of pre-ionizer 20 has a gas-tight fit in an aperture 52 extending through partition 46 (see FIGS. 4 and 7). Base 50A of crucible 50 has two rectangular extensions or electrode-jackets 54 extending into laser enclosure 22. The extensions are spaced apart and parallel to each other leaving a narrow space or gap 56 therebetween (see FIGS. 4, 5, and 5A. The extensions preferably extend into enclosure 22 for a distance of about between about 5.0 mm and 8.0 mm, and gap 56 preferably has a width between about 0.5 mm and 1.0 mm. Each of the extensions includes an elongated hollow space 58, extending in the width direction from the base of the crucible, for receiving an electrode (see FIG. 7). The wall thickness of electrode-jackets 54 is preferably greater than about 0.5 mm and preferably less than about 1.5 mm.

An elongated rectangular metal electrode 60 having a shape corresponding to the shape of hollow spaces 58 in the electrode jackets is inserted into each of the spaces (see FIGS. 4, 5, 8, and 9). Electrodes 60 may be designated as pre-ionizer electrodes or simply ionizer electrodes. Electrodes 60 are mounted on an insulating disc or a printed circuit board 62 (see FIGS. 4, 8 and 9). Crucible 50 is clamped into partition wall 46 by a clamping plate 64, a spacing ring 66, a spring washer 68 and screws 70 (see FIGS. 3, 4, 6, and 7). Printed circuit board 62 with electrodes 60 thereon is clamped to base 50A of crucible 50 by a cross-shaped printed circuit board 72, a spacing tube 74, a washer 76 and screws 78 (see FIGS. 3, 4, and FIG. 8).

Printed circuit board 72 includes a metal-plated section 80 arranged to leave an octagonal shaped insulating section 82 (see FIG. 3). RF power is applied to one of the electrodes 60 via a lead 84 passing through the insulated section 82 of printed circuit board 72 and inserted into the electrode (see FIGS. 3, 4, and 8). The RF power is supplied from a power supply, designated only symbolically in FIG. 3. The other electrode 60 is connected to ground via a lead 86 passing through insulated area 82 of printed circuit board 72 and soldered to plated section 80 of the printed circuit board (see FIGS. 3, 4, and 8). Screws 78 ground the plated section of the printed circuit board to the extrusion 44. Applying the RF power across electrodes creates a local discharge 88 in lasing gas in enclosure 22 (see FIG. 4). By way of example, for rectangular electrodes 60 having a length of 7.0 mm and a height of 5.0 mm and an alumina ceramic jacket wall thickness of 1.0 mm, an average RF power of between about 5.0 Watts (W) 10.0 W is needed to sustain discharge 88. By way of comparison, between about 500 W and 5000 W may be applied to the main slab electrodes of the laser, depending on efficiency of the laser and the desired output power.

The discharge 88 is concentrated primarily in rectangular gap 56 between ceramic electrode jackets 54, but may spill out to at least partially surround the electrode jackets as indicated by a shaded area in FIG. 4. This discharge is remote from the main slab electrodes of the laser and should not be confused with the main, laser-energizing discharge between the slab electrodes. A purpose of discharge 88 is to maintain a constant presence of ions in lasing gas in enclosure 22 to facilitate ignition of the main discharge when RF power is applied across the slab electrodes.

FIG. 10, FIG. 11, FIGS. 12–12A, and FIGS. 13–16 schematically illustrate another preferred embodiment 20A of a pre-ionizer in accordance with the present invention. Pre-ionizer 20A is similar to pre-ionizer 20 of FIGS. 3 and 4 with an exception that the two elongated face-to-face electrodes 60 thereof are replaced in pre-ionizer 20A by a central (post) electrode 65 surrounded by an annular (ring) electrode 61, with the electrodes mounted in a printed circuit board 63 (see FIGS. 11, 15, and 16). Pre-ionizer 20A includes a ceramic crucible 51 similar to crucible 50 of pre-ionizer 20 with an exception that pre-ionizer 20A has, extending from base 51A thereof, a central post extension 55 surrounded by an annular extension 53, leaving an annular gap 57 between the extensions (see FIGS. 11, 12–12A, and 14). Extensions 55 and 53 include, respectively, an annular slot 59 and a bore 63 arranged to accommodate respectively the ring and post electrodes (see FIGS. 11, 13, and 14). Electrode 61 includes an annular slot having a width sufficient to accommodate insertion of ground lead 86. Other construction, assembly and wiring details of pre-ionizer 20A are similar to corresponding details discussed above with reference to pre-ionizer 20. Applying RF power across the ring and post electrodes causes discharge 88, here, concentrated in annular gap 57 between ceramic electrode jackets 53 and 55, but spilling out to at least partially surround the electrode jackets.

In another aspect of the inventive pre-ionizer, in both of the above described embodiments, the ceramic crucible and the extensions thereof that jacket the ionizer electrodes can be defined as a dielectric window or barrier between the inside of the laser enclosure 24 at the reduced, lasing gas pressure and the outside of the laser enclosure (here, power enclosure 22) at atmospheric pressure. As such, while the dielectric or ceramic-jacketed electrodes are described as extending into the laser enclosure, the electrodes without the ceramic jackets are actually outside laser enclosure 22. The secondary gas discharge 88 can be described as being formed by capacitively coupling RF power through the ceramic barrier into the lasing gas in the laser enclosure.

The present invention is described above in terms of a preferred and other embodiments. The invention is not limited, however, to the embodiments described and depicted. Rather, the invention is limited only by the claims appended hereto.

What is claimed is:

1. A gas laser including two elongated slab electrodes arranged face-to-face defining a gap therebetween, the electrodes being located in an enclosure containing a laser gas at reduced pressure, the laser gas filling the gap between the slab electrodes, the laser being energized by applying electrical power across the slab electrodes thereby igniting a first gas discharge in the laser gas between the electrodes, the laser further comprising:

first and second spaced apart ionizer electrodes;

a dielectric jacket surrounding and sealing said electrodes, said jacket including a recess disposed between said electrodes, said jacketed electrodes extending into the enclosure at a location spaced from said slab electrodes; and a circuit for applying RF power to said dielectric-jacketed ionizer electrodes in order to create a second gas discharge in said space between said ionizer electrodes, said second gas discharge providing ions in the laser gas and thereby facilitating ignition of said first gas discharge.

2. The laser of claim 1, wherein said first and second ionizer electrodes are rectangular electrodes arranged face-to-face, and said space therebetween is correspondingly rectangular.

3. The laser of claim 1, wherein said first dielectric-jacketed ionizer electrode is in the form of a post, said second dielectric-jacketed ionizer electrode is annular and surrounds said first dielectric-jacketed ionizer electrode and with the recess in the dielectric jacket being correspondingly annular.

4. The laser of claim 1, wherein said dielectric-jacketed ionizer electrodes extend into the enclosure for a distance between about 5.0 and 8.0 millimeters.

5. The laser of claim 1, wherein said dielectric material of the jacket surrounding said ionizer electrodes has a minimum thickness greater than about 0.5 millimeters.

6. The laser of claim 1, wherein said recess in the jacket has a width between about 0.5 and 1.5 millimeters.

7. The laser of claim 1, wherein said dielectric jacket surrounding said ionizer electrodes is formed from a material that is not corroded by said gas discharge.

8. The laser of claim 7, wherein said dielectric jacket material is a ceramic material.

9. The laser of claim 8, wherein said dielectric jacket material is an alumina ceramic.

10. The laser of claim 1, wherein said secondary gas discharge at least partially surrounds said dielectric-jacketed electrodes.

11. A preionizer for a gas laser including two elongated slab electrodes arranged face-to-face defining a gap therebetween, the electrodes being located in an enclosure containing a laser gas at reduced pressure, the laser gas filling the gap between the slab electrodes, the laser being energized by applying electrical power across the slab electrodes thereby igniting a discharge in the laser gas between the electrodes, the preionizer comprising:

a pair of spaced apart ionizer electrodes extending into the enclosure; and a ceramic jacket surrounding and sealing said electrodes from the laser gas, said jacket having a recess extending inwardly from the outer surface thereof, said recess being located in the space between the ionizer electrodes so that when said ionizer electrodes are energized, the laser gas located in the recess will become ionized thereby facilitating the ignition of the laser discharge.

12. The preionizer of claim 11, wherein said ionizer electrodes are rectangular electrodes arranged face-to-face, and said space therebetween is correspondingly rectangular.

13. The preionizer of claim 11, wherein one of said ionizer electrodes is annular in shape and surrounds the other ionizer electrode and with the recess in said jacket being substantially annular.

14. The preionizer of claim 11, wherein said ionizer electrodes extend into the enclosure for a distance between about 5.0 and 8.0 millimeters.

15. The preionizer of claim 11, wherein said ceramic material of the jacket surrounding said ionizer electrodes has a minimum thickness greater than about 0.5 millimeters.

16. The preionizer of claim 11, wherein recess in the jacket has a width between about 0.5 and 1.5 millimeters.

* * * * *